(12) United States Patent
Xie et al.

(10) Patent No.: US 7,330,328 B2
(45) Date of Patent: Feb. 12, 2008

(54) RANDOM NUMBER GENERATION USING BACK ELECTROMOTIVE FORCE (BEMF) VALUES

(75) Inventors: WenXiang Xie, Singapore (SG); LeeLing Tan, Singapore (SG); Xiong Liu, Singapore (SG); WeiLoon Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/356,499

(22) Filed: Feb. 17, 2006

(65) Prior Publication Data

US 2007/0195448 A1    Aug. 23, 2007

(51) Int. Cl.
*G11B 21/02* (2006.01)
(52) U.S. Cl. .................................................. 360/75
(58) Field of Classification Search ............... None
See application file for complete search history.

(56) References Cited

U.S. PATENT DOCUMENTS

| | | | |
|---|---|---|---|
| 4,694,412 A | 9/1987 | Domenik et al. | |
| 4,769,777 A | 9/1988 | Bittle et al. | |
| 5,214,423 A | 5/1993 | Antoniou | |
| 5,513,260 A | 4/1996 | Ryan | |
| 5,844,743 A | 12/1998 | Funches | |
| 6,374,278 B1 | 4/2002 | Korn et al. | |
| 6,408,387 B1 | 6/2002 | Wells | |
| 6,542,014 B1 | 4/2003 | Saito | |
| 6,792,438 B1 | 9/2004 | Wells et al. | |
| 6,886,023 B2 | 4/2005 | Lundberg | |
| 6,950,272 B1 * | 9/2005 | Rice et al. | 360/78.06 |
| 6,965,907 B2 | 11/2005 | Klauss | |
| 7,042,672 B2 * | 5/2006 | Brenden et al. | 360/75 |
| 2001/0019463 A1 | 9/2001 | Drouin | |
| 2004/0258398 A1 * | 12/2004 | Cho et al. | 386/96 |

FOREIGN PATENT DOCUMENTS

| | | |
|---|---|---|
| EP | 0 981 081 A2 | 8/1999 |
| WO | WO 03/079181 A2 | 9/2003 |

* cited by examiner

*Primary Examiner*—K. Wong
(74) *Attorney, Agent, or Firm*—Fellers, Snider, et al.

(57) ABSTRACT

Method and apparatus for generating a random number, such as for use in a security protocol to control access to a data processing system. A processor generates the random number in relation to a back electromotive force (BEMF) value. The BEMF value is preferably obtained in response to application of current to a circuit. The circuit preferably comprises a coil and the application of current preferably induces a relatively small movement of the coil. The random number is preferably a multi-bit digital value, and each bit of the random number is determined in relation to whether the corresponding BEMF value is even or odd. The coil preferably comprises a coil of a voice coil motor (VCM) used to position a transducer adjacent a rotatable storage medium, and the random number is preferably generated while the medium is in a non-rotatable state.

24 Claims, 4 Drawing Sheets

HISTOGRAM OF GENERATED
RANDOM NUMBERS

AUTOCORRELATION ANALYSIS

POWER SPECTRAL DENSITY

RANDOM NUMBER GENERATION USING BACK ELECTROMOTIVE FORCE (BEMF) VALUES

FIELD OF THE INVENTION

The claimed invention relates generally to the field of digital data processing systems and more particularly, but not by way of limitation, to an apparatus and method for generating a random number in relation to a back electromotive force (BEMF) voltage.

BACKGROUND

In the area of digital data processing devices, a continuing trend is to provide devices with higher rates of functionality and interconnectivity. This has generally led to greater amounts of confidential or personal information being stored or accessed by these devices.

While enhancing personal convenience and individual productivity, this trend also undesirably increases the chances of unauthorized access and dissemination of such information. This is exasperated by the fact that many such consumer electronic devices are portable hand-held devices, and these can be easily misplaced or stolen.

Some device developers have implemented security systems in an attempt to reduce the ability of a third party to gain access to the information in such a device. Such security systems often implement a security protocol that relies upon the ability to generate a true random number.

While a variety of systems have been proposed in the art, there is a continued need for improvements whereby a true random number can be generated easily and efficiently without a significant consumption of power by a device. It is these and other improvements that preferred embodiments of the present invention are generally directed.

SUMMARY OF THE INVENTION

Preferred embodiments of the present invention are generally directed to a method and apparatus for generating a random number, such as for use in a security protocol to control access to a data processing system.

In accordance with preferred embodiments, a processor generates the random number in relation to a back electromotive force (BEMF) value. The processor is preferably a programmable processor, but can alternatively be realized as a hardware processor.

The BEMF value is preferably obtained in response to application of current to a circuit. The circuit preferably comprises a coil and the application of current preferably induces a relatively small movement of the coil.

The random number is preferably a multi-bit digital value, and each bit of the random number is determined in relation to whether the corresponding BEMF value is even or odd. The coil preferably comprises a coil of a voice coil motor (VCM) used to position a transducer adjacent a rotatable storage medium, and the random number is preferably generated while the medium is in a non-rotatable state.

These and various other features and advantages that characterize the claimed invention will be apparent upon reading the following detailed description and upon review of the associated drawings.

DETAILED DESCRIPTION

Figure 1:
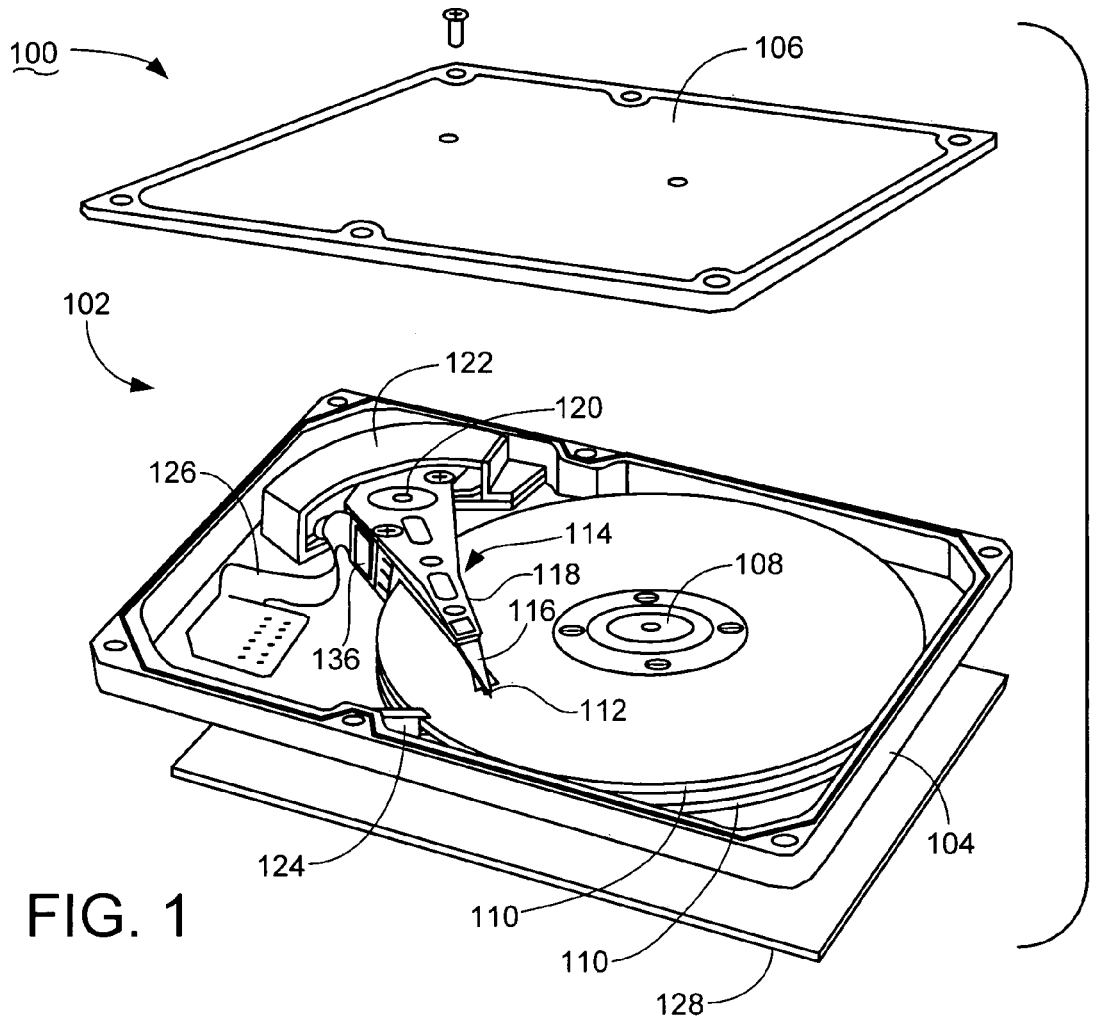
FIG. 1 is a plan view of a disc drive block data storage device constructed and operated in accordance with preferred embodiments of the present invention.

Referring now to the drawings, FIG. 1 provides a top plan view of a disc drive block data storage device 100. The drive 100 is provided to show an exemplary environment in which preferred embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers 112. Preferably, the transducers ("heads") are hydrodynamically supported adjacent the media by fluidic currents established by high speed rotation of the media 110.

While FIG. 1 shows the use of two magnetic recording discs and four corresponding heads, other numbers of heads and discs (such as a single disc, etc.) and other types of media (such as optical media, etc.) can alternatively be utilized as desired. Of course, other implemented environments require neither media nor heads at all.

The transducers 112 form a portion of a head-stack assembly ("HSA" or "actuator") 114. More specifically, each transducer 112 is preferably supported by a corresponding flexible suspension ("flexure") 116, which in turn is supported by a rigid actuator arm 118. The actuator 114 preferably pivots about a cartridge bearing assembly 120 through application of current to a voice coil motor (VCM) 122. In this way, controlled operation of the VCM 122 causes the transducers 122 to align with tracks (not shown) defined on the media surfaces to store data thereto or retrieve data therefrom.

Preferably, when the device is not in use, the transducers 112 are moved (unloaded) to a ramp structure 124 located near an outermost periphery of the media. The ramp structure 124 serves to provide respective surfaces on which the transducers 112 can safely be disposed while the media 110 are in a non-rotational state. When device I/O operation is desired, the spindle motor 108 accelerates the media 110 to a velocity sufficient to support the transducers 112, and the transducers 112 are moved (loaded) from the ramp structure 124 to supported positions adjacent the media 110.

While a ramp structure has been provided for purposes of illustrating a preferred embodiment, such is not necessarily required. For example, embodiments that employ rotatable media and moveable transducers as shown in FIG. 1 can alternatively utilize other support configurations such as a contact start stop (CSS) approach whereby the transducers are brought to rest upon texturized landing zones near the innermost periphery of the media 110.

FIG. 1 further shows a flex circuit assembly 126 that facilitates electrical communication between the actuator 114 and device control electronics on an externally disposed device printed circuit board (PCB) 128.

Figure 2:
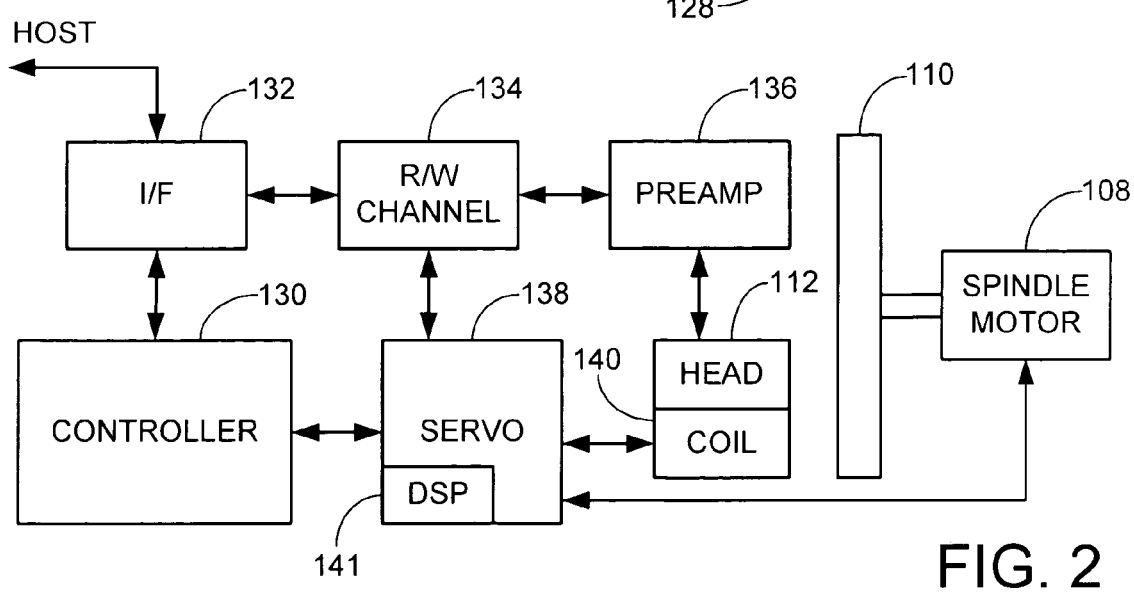
FIG. 2 shows a simplified functional diagram of the device of FIG. 1.

FIG. 2 provides a functional block diagram of the device 100 of FIG. 1. A programmable controller 130 provides top-level communications and control for the device. An interface (I/F) block 132 facilitates I/O communications and transfers with a host device (not shown) with which the device 100 is associated. A read/write (R/W) channel 134 conditions data to be written to the media 110 from the host during a write operation, and reconstructs previous stored data retrieved from the media 110 for transfer to the host during a read operation.

A preamplifier/driver circuit (preamp) 136 applies the requisite write currents to the selected transducer during writing and the requisite read bias currents and signal preamplification during reading. The preamp 136 is preferably mounted to the side of the actuator 114, as shown in FIG. 1.

A servo circuit 138 provides closed-loop positional control for the transducers 112 using servo data written to the media 110 during device manufacture. The servo circuit 138 is preferably configured to carry out a number of control functions including track following operations whereby a selected transducer 112 follows a corresponding track on the media, seek operations whereby a selected transducer 112 is moved from an initial track to a destination track, and head load/unload operations whereby the transducers are moved away from or to the ramp structure 124.

The servo circuit 138 applies the requisite currents to a coil 140 of the VCM 122 to carry out these various operations. The servo circuit 138 further preferably includes a spindle motor driver circuit (not separately shown) to controllably operate the spindle motor 108. Processing requirements to carry out these and other servo functions are preferably supplied by a DSP 141 or other processing device of the servo circuit 138, such as an ARM. The servo processing can alternatively be supplied by the top level controller 130 in a single processor environment.

Figure 3:
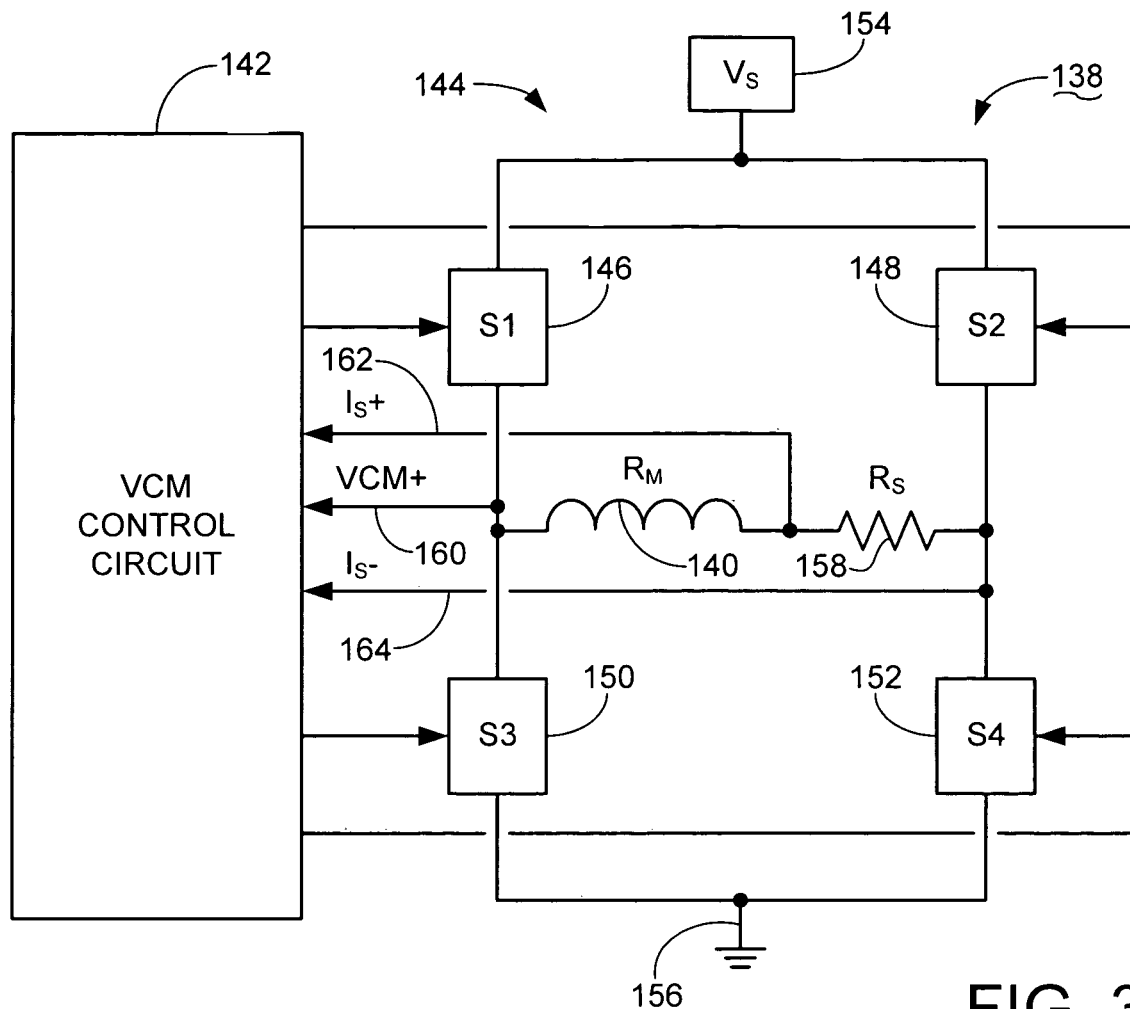
FIG. 3 provides a schematic representation of control circuitry used to control operation of a voice coil motor (VCM) of the device of FIG. 1.

FIG. 3 provides a generalized schematic representation of relevant portions of the servo circuit 138 of FIG. 2. A VCM control circuit 142 preferably utilizes an h-bridge driver circuit 144 to supply bi-directional currents through the VCM coil 140. Switching devices S1-S4 are numerically denoted at 146, 148, 150 and 152 and preferably comprise suitable field effect transistors (FETs). The switching devices S1-S4 are arranged between a $V_C$ voltage source 154 and a reference line (ground) 156.

In this way, current can be passed through the coil 140 in a first direction through the selective energizing (induced source-drain conduction) of switches S1 and S4, and current can be passed through the coil 140 in a second opposite direction through the selective energizing of switches S2 and S3.

A current sense resistor 158 is preferably placed in series with the coil 140 as shown. The respective steady-state resistances of the coil 140 ($R_M$) and the sense resistor 158 ($R_S$) are both preferably on the order of a few ohms. Feedback taps are provided by signal lines 160, 162 and 164 to provide signals VCM+, $I_S$+ and $I_S$− respectively to the VCM control circuit 142. The difference between lines 160 and 164 will represent the overall voltage drop across the coil 140 and the sense resistor 158; the difference between lines 160 and 162 will represent the voltage drop of the coil 140; and the difference between lines 162 and 164 will represent the voltage drop across the sense resistor 158.

During I/O operation of the device, the servo circuit 138 operates to position the transducers 112 adjacent the rotating media 110. The VCM control circuit 142 is commanded to provide a specified current (magnitude and direction) through the coil 140. At least in certain operational modes this current can be monitored using the relation $I_M = V_S/R_S$, where $I_M$ is the actual current through both coil 140 and sense resistor 158, $V_S$ is the voltage obtained from paths 162 and 164, and $R_S$ is the known (or measured) resistance of the sense resistor 158.

At this point it will be noted that there may be a number of ways to generate random numbers during such I/O operation of the device. For example, it has been generally proposed in the art to spin up the media, load the transducers, and then perform data reading operations. Using various characteristics of the resulting reads, a population distribution of nominally random numbers can be obtained.

A limitation of this approach is the need to initiate acceleration of the media and the loading of the transducers to interact therewith. This can consume significant amounts of power which can be detrimental particularly in battery-based or otherwise power limited systems. Also, it can take a relatively significant amount of time to accelerate the media 110 to an operational velocity, load the transducers 112, and then carry out the necessary accesses. This undesirably delays the ability of the security system to quickly resolve access requests and make a determination to grant or prevent access to the device.

Figure 4:
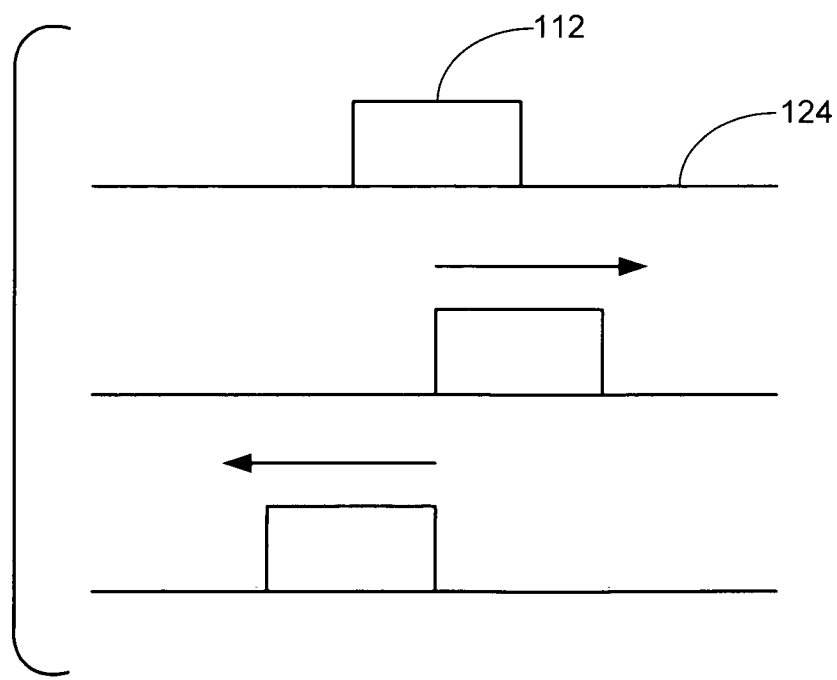
FIG. 4 depicts a selected transducer on an associated ramp load/unload surface of the device to illustrate a relatively small "wiggle" movement induced by the circuit of FIG. 3 in accordance with preferred embodiments.

Accordingly, the VCM control circuit 142 is preferably configured to facilitate the generation of true random numbers by the device 100 without the need to either initiate acceleration of the media 110, or to load the transducers 112 over the media 110. The random numbers are preferably obtained by inducing the generation of low levels of back electromotive (BEMF) voltage by the coil 140. As explained below, the BEMF is preferably generated by inducing a small amount of "wiggle," or oscillatory motion of the transducers 112 on the corresponding ramp structure, as generally depicted in FIG. 4.

Figure 5:
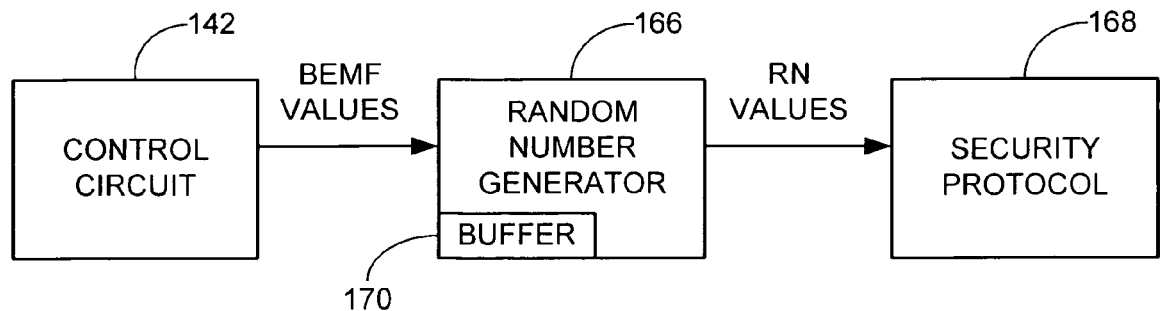
FIG. 5 shows a functional block representation of the preferred use of back electromotive force (BEMF) voltages obtained by FIGS. 3 and 4 to generate true random numbers for use by a security protocol.

During this operation, BEMF values are sampled by the VCM control circuit 142. As shown in FIG. 5, these BEMF values are supplied to a random number generator block 166, which uses a selected algorithm to generate true random number (RN) values therefrom. The random number generator block 166 is preferably realized as a portion of the servo DSP 141 (FIG. 2) with associated programming to carry out the random number generator operations, but can alternatively be realized in hardware as a hardware processor.

The random number generator block 166 forwards the RN values to a security protocol 168. The security protocol 168 thereafter uses the RN values to grant or deny access. Since any number of conventional ways is known to actually implement a security protocol once a random number has been generated, further discussion of the actual security protocol is omitted as unnecessary.

As will be recognized, BEMF is a voltage (EMF) that opposes a normal flow of current in a circuit. BEMF can particularly be induced in opposition to movement of a coil through a magnetic field, such as with the coil 140 and the surrounding magnetic circuit of the VCM 122. In this case the BEMF will generally increase with higher coil velocities, as well as a number of other parameters. It has been found that at particularly low velocities, the BEMF value can be dominated by various unpredictable parameters such as signal noise and electrical offsets. Such parameters are preferably advantageously utilized, as will now be discussed.

Figure 6:
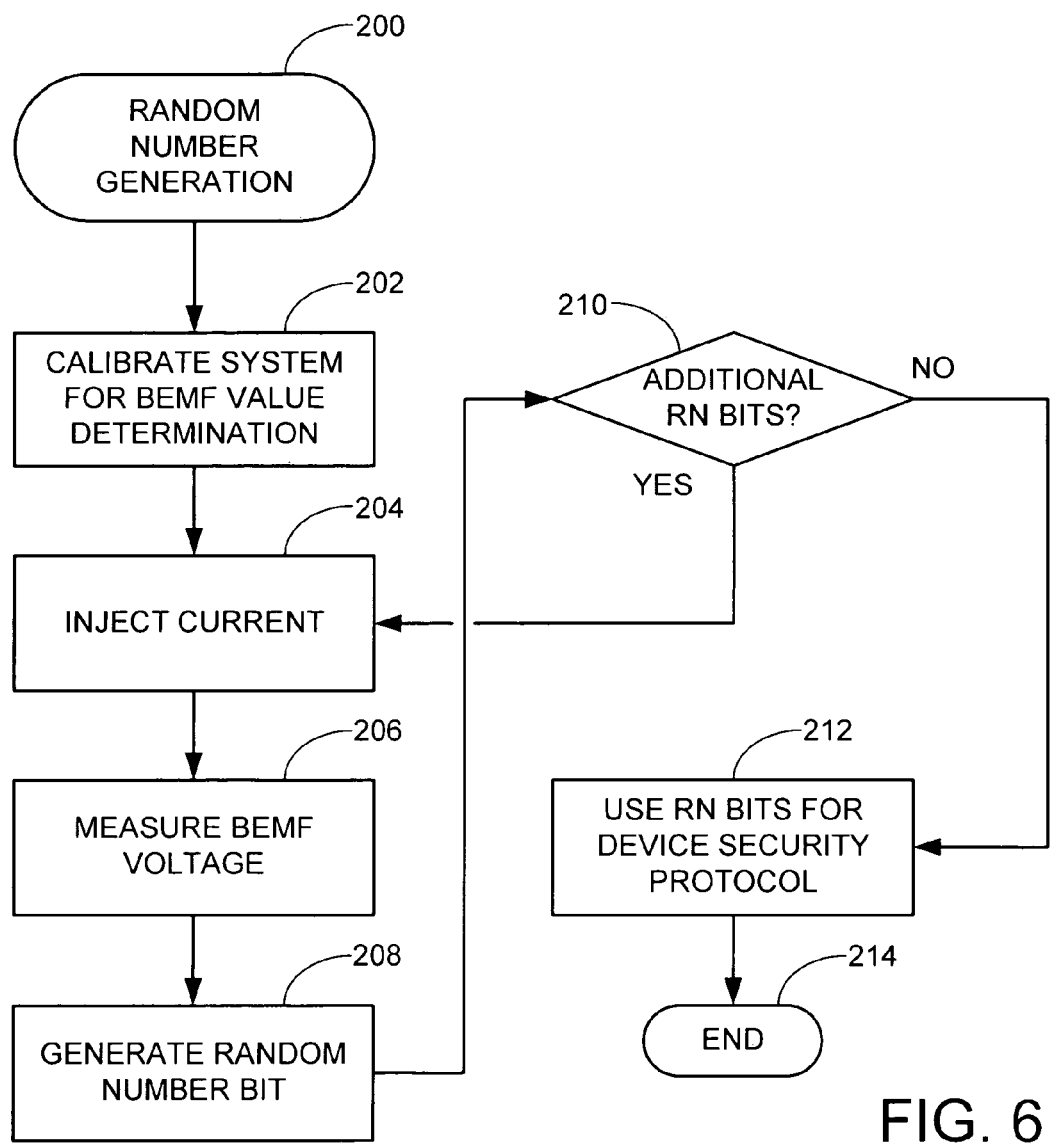
FIG. 6 provides a flow chart for a RANDOM NUMBER GENERATION routine, illustrative of steps carried out in accordance with preferred embodiments of the present invention.

FIG. 6 provides a flow chart for a RANDOM NUMBER GENERATION routine 200, illustrative of preferred steps carried out to implement the system of FIG. 5. At step 202, a calibration operation is first performed. This calibration is preferably carried out to derive a coefficient value sufficient to allow the BEMF values to be measured in a suitable range.

Preferably, step 202 involves the application of an initial, relatively small amount of current in a selected direction to the coil 140 by the circuitry of FIG. 3. This induces a small amount of movement of the coil 140 (and hence, the transducers 112) as shown in FIG. 4 in a common rotational direction. During this movement, measurements are preferably taken of the voltages on paths 160, 162 and 164. These measurements are preferably utilized in the following equation:

$$V = (R_M + R_S)I_M + BEMF + \alpha \quad (1)$$

Where V is the voltage that can be measured across the coil 140 and sense resistor 158, $I_M$ is the magnitude of the injected current, $R_M$ is the resistance of the coil 140, $R_S$ is the resistance of the sense resistor 158, BEMF is the back emf voltage induced by motion of the coil, and $\alpha$ is a coefficient. It follows that when the coefficient $\alpha$ is set to the following value:

$$\alpha = -(R_M + R_S)I_M \quad (2)$$

then $$V = BEMF \quad (3)$$

In this way, the VCM control circuit 142 can determine a BEMF value at any given time by determining the actual voltage sensed across paths 160 and 164 and applying the $\alpha$ coefficient determined by equation 2. As noted previously, the BEMF values obtained in this way will preferably be dominated by noise, offsets and other random effects.

Once the calibration step 202 is completed, the flow of FIG. 6 proceeds to step 204 where a new current value is injected into the system. This is preferably carried out by modifying the previously applied current in relation to the determined BEMF, such as in accordance with the following relation:

$$I_{M2} = -(I_{M1} + (BEMF1)(\beta)) \quad (4)$$

where $I_{M2}$ is the new current value, $I_{M1}$ is the previously applied current value, BEMF1 is the most recently determined BEMF value, and $\beta$ is a scaling factor. Note that $I_{M2}$ in equation (4) is provided with a polarity that is opposite in direction as compared to $I_{M1}$. In this way, the application of $I_{M2}$ will induce movement of the coil 140 and transducer 112 in the opposite direction as previously induced by $I_{M1}$ (see e.g., FIG. 4). This is preferred, but not necessarily required.

It will be noted that the use of the BEMF value to scale the new current value is preferred, but not required. For example, in some alternative embodiments, the same current magnitude is applied in each direction, or the current magnitudes are varied in accordance with a preselected profile.

Once the new current is injected by step 204, a new BEMF value is determined at step 206. This value is preferably provided by the VCM control circuit 142 to the random number generator 166 (FIG. 5) for generation of a random number therefrom at step 208 (FIG. 6).

Although not shown for simplicity of illustration, it is contemplated that the VCM control circuit 142 employs a series of analog-to-digital converters (ADCs) to provide multi-bit digital representations of the voltages sensed at the paths 160, 162 and 164. The calculations carried out to determine the BEMF values are also preferably carried out digitally, so that the BEMF values provided to the random number generator 166 are multi-bit digital values of given size (e.g., 8 bits, 16 bits, etc.).

In a preferred embodiment, the random number generator 166 determines whether the BEMF value is even or odd. This is preferably determined by evaluation of the least significant bit (LSB) of the BEMF value, although other techniques can be utilized as well. Preferably, if the BEMF value is determined to be even, a "0" bit is generated, and if the BEMF value is odd, a "1" bit is generated.

The operation of step 208 preferably results in the generation of one bit out of the total number of required bits for the finally generated random number. That is, it is contemplated that the security protocol 168 (FIG. 5) will require a random number of selected length (e.g., 16 bits, 32 bits, 128 bits, etc.). In such case, the flow of FIG. 6 preferably passes back through the routine a sufficient number of times to fully populate the random number.

Accordingly, decision step 210 determines whether additional random number bits are required; if so, the process returns to steps 204-208 where additional current values are injected, BEMF values are determined, and RN bits are obtained therefrom. Preferably, each operation of step 208 results in the loading of the then-determined bit of the random number into a selected bit location of a buffer 170 (FIG. 5). In this way, the random number can be sequentially assembled from the individual bits.

Once the random number has been fully populated, the final number is forwarded to the security protocol 168 at step 212 and the process ends at step 214.

Empirical analysis has demonstrated the efficacy of the foregoing preferred embodiments in generating true random numbers. A particular 2.5 inch form factor device (substantially like the device 100 in FIG. 1) was configured to carry out the routine of FIG. 6 and collect 576,000-byte BEMF values. These data were converted to 72,000-byte random numbers.

Figure 7:
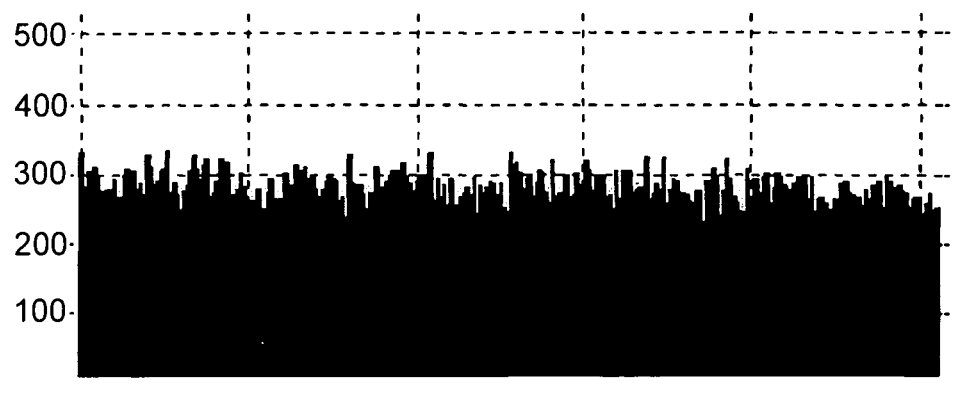
FIG. 7 provides a histogram distribution of random numbers generated by the routine of FIG. 6.

FIG. 7 provides a histogram of the associated results for these data grouped into 8-bit random numbers (which provides base 10 values of from 0 to 255). As can be seen from FIG. 7, the overall distribution of these values is substantially uniform.

To further evaluate the true randomness of the data, white noise was used as a reference. As will be recognized, white noise is a signal response that theoretically meets the following two conditions:

Condition 1. The autocorrelation sequence (a measure of dependence between values of the random process at different times) should be equal to zero except for a peak at zero (which implies values at any two different moments in time are uncorrelated).

Condition 2. The power spectral density should be constant (which implies equal power at all frequencies).

Figure 8:
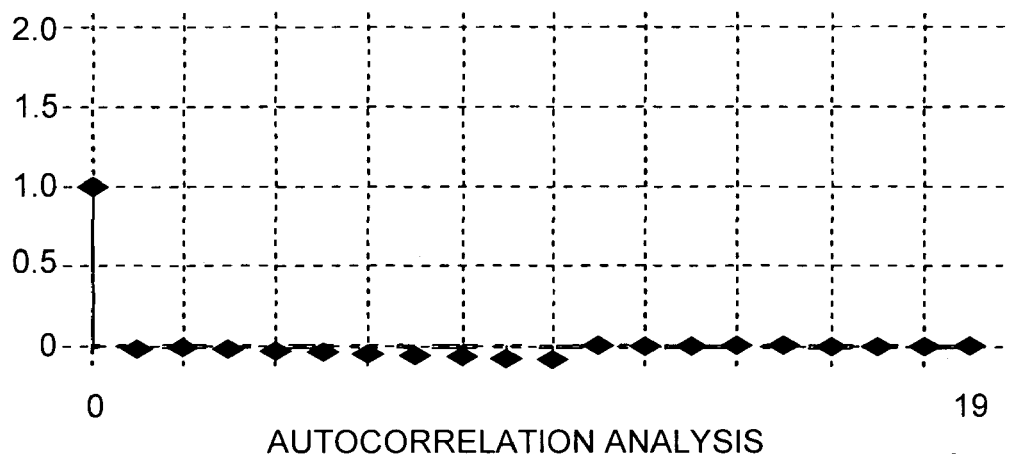
FIG. 8 provides results of an autocorrelation analysis of the data of FIG. 7.

The results of an autocorrelation analysis are set forth in FIG. 8. A total of 20 lags were computed by default. As shown in FIG. 8, there is a peak at sample 0, and the remaining samples are substantially equal to zero. Accordingly, the autocorrelation sequence substantially conforms to Condition 1 above.

Figure 9:
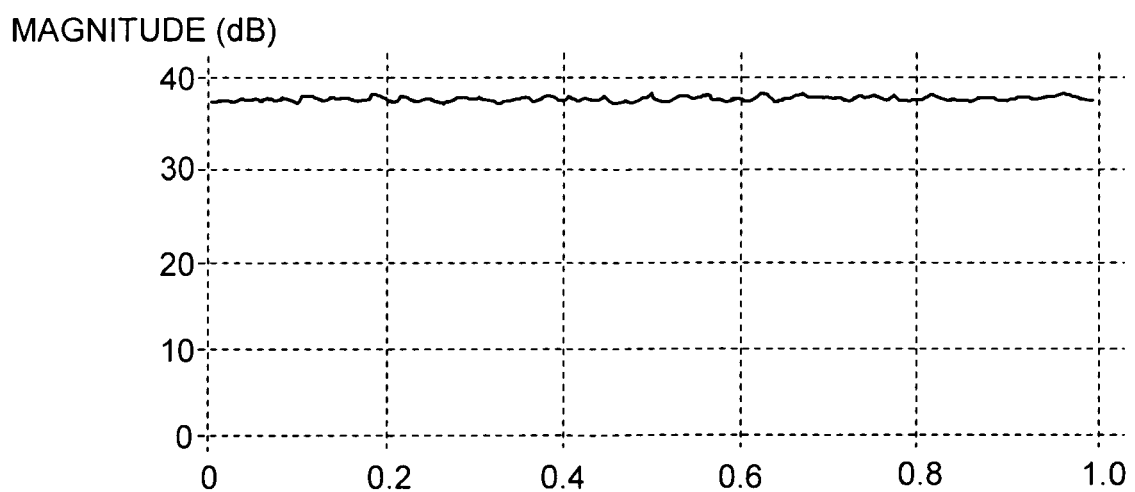
FIG. 9 shows a power spectral density plot for the data of FIG. 7.

A calculated power spectral density curve is represented in FIG. 9. The magnitude across the spectrum is substantially constant, which means that the power spectral density substantially conforms to Condition 2 above.

From the foregoing it can be seen that the data obtained in accordance with the foregoing preferred embodiments can substantially be considered as white noise, and the numbers generated therefrom can be considered as constituting true random numbers.

It is contemplated that more elaborate schemes for processing the BEMF values by the pattern generator 158 can be utilized in lieu of the preferred approach discussed above. Such schemes can include, for example, the application of combinatorial logic operations to the received BEMF values. However, since the preferred approach has been found to provide substantially white noise response, such additional processing was deemed unnecessary in the disclosed embodiments. In other applications, however, it is contemplated that such additional processing may be found desirable to enhance the randomness of the resulting distribution of bits.

While preferred embodiments have utilized a VCM coil to generate the random numbers, it will be appreciated that such is not necessarily required; rather, BEMF values can be obtained in any number of different types of devices and circuits to generate random numbers in accordance with the various embodiments presented herein. Thus, while the BEMF values have been exemplified as being generated through application of current to a coil immersed in a magnetic field, such is not limiting to the claimed invention.

Moreover, while preferred embodiments have been directed to the use of the resulting random numbers in a security protocol to control access to a device, the claimed invention is not so limited. Rather, the random numbers can be utilized in any manner desired, including in any number and varieties of processing systems, applications and/or environments in which the generation of random numbers is deemed useful.

For purposes of the appended claims, the recited "first means" will be understood consistent with the foregoing discussion to at least correspond to the disclosed random number generator 166, realized as a hardware or software processor.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although the embodiments described herein are directed to the generation of random numbers in a disc drive data storage device, it will be appreciated by those skilled in the art that the process can be used in any number of other types of devices and environments without departing from the spirit and scope of the claimed invention.

What is claimed is:

1. A method comprising a step of generating a random number in relation to a back electromotive force (BEMF) value.

2. The method of claim 1, further comprising a step of applying current to a circuit, and wherein the BEMF value of the generating step is obtained from said application of current.

3. The method of claim 2, wherein the circuit of the applying step comprises a coil configured to position a transducer adjacent a rotatable medium, and wherein the current of the applying step is applied to the coil while the medium is in a non-rotational state.

4. The method of claim 1, further comprising a step of measuring a voltage across a coil and determining the BEMF value in relation to said voltage.

5. The method of claim 1, wherein the generating step comprises generating a bit of said random number in relation to whether the BEMF value is even or odd.

6. The method of claim 1, wherein the random number of the generating step comprises n bits, and wherein each bit of said random number is separately generated by steps of applying a current pulse to a circuit, measuring the associated BEMF value, and evaluating the BEMF value to set each said bit.

7. The method of claim 1, wherein the method further comprises steps of:
   applying a first magnitude of current to a coil; and
   subsequently applying a second magnitude of current to the coil determined in relation to the first magnitude of current and the BEMF value.

8. The method of claim 1, further comprising a step of providing the random number to a security protocol which provides access control to a device.

9. An apparatus comprising a circuit configured to generate a random number with a magnitude selected in relation to a magnitude of a back electromotive force (BEMF) value.

10. The apparatus of claim 9, further comprising a control circuit configured to apply current to a circuit, and wherein the BEMF value is obtained in response to said application of current.

11. The apparatus of claim 9, wherein the circuit comprises a processor configured to identify a voltage across a coil and determine the BEMF value in relation to said voltage.

12. The apparatus of claim 9, wherein the circuit is configured to generate a bit of said random number in relation to whether the BEMF value is even or odd.

13. The apparatus of claim 9, wherein the random number comprises n bits, and wherein each bit of said random number is separately generated by the application of a current pulse to a circuit coil and a measurement of a resulting BEMF value, and by operation of the circuit to evaluate the resulting BEMF value to set each bit.

14. The apparatus of claim 9, further comprising a control circuit configured to apply a first magnitude of current to a coil, measure the associated BEMF value, and subsequently apply a second magnitude of current to the coil in relation to the first magnitude of current and the BEMF value.

15. The apparatus of claim 14, wherein the coil comprises a coil of a voice coil motor (VCM).

16. The apparatus of claim 14, wherein the coil is configured to position a transducer adjacent a rotatable medium, and wherein the current is applied to the coil by the control circuit while the medium is in a non-rotational state.

17. The apparatus of claim 14, further comprising a current sense resistor coupled in series with the coil, wherein the control circuit senses a combined voltage drop across the coil and the sense resistor.

18. The apparatus of claim 14, further comprising an h-bridge driver circuit configured to provide said current to the coil in response to the control circuit.

19. The apparatus of claim 14, further comprising a transducer coupled to the coil and a ramp structure configured to contactingly support the transducer, wherein the current applied to the coil by the control circuit induces bi-direction sliding movement of the transducer upon the ramp structure.

20. The apparatus of claim 9, wherein the circuit comprises a programmable processor with associated programming to generate the random number.

21. An apparatus comprising:
a coil; and
first means for generating a random number in relation to a back electromotive force (BEMF) generated by said coil.

22. The apparatus of claim 21, wherein the first means comprises a processor.

23. The apparatus of claim 21, wherein the coil and the first means are incorporated into a data storage device.

24. The method of claim 1, further comprising a step of using the generated random number in a security protocol to grant or deny access to data.

* * * * *